United States Patent [19]

van Spaandonk et al.

[11] 4,249,197

[45] Feb. 3, 1981

[54] METHOD AND DEVICE FOR ADJUSTING A TELEVISION CAMERA BY MEANS OF A MONITOR PICTURE, PRIOR TO SCENE RECORDING

[75] Inventors: Jacobus A. A. J. van Spaandonk; Filippus L. Stok, both of Breda, Netherlands

[73] Assignee: U.S. Philips Corporation, New York, N.Y.

[21] Appl. No.: 27,555

[22] Filed: Apr. 6, 1979

[30] Foreign Application Priority Data

Apr. 6, 1978 [NL] Netherlands ..................... 7803660

[51] Int. Cl.³ .......................... H04N 9/62; H04N 7/02
[52] U.S. Cl. ...................................... 358/10; 358/139; 358/29; 358/41
[58] Field of Search ................... 358/29, 41, 10, 21 R, 358/42, 43, 50, 139, 160, 185, 209

[56] References Cited

U.S. PATENT DOCUMENTS

4,158,208   6/1979   Dischert ........................ 358/41

Primary Examiner—Howard W. Britton
Assistant Examiner—Michael Allen Masinick
Attorney, Agent, or Firm—Thomas A. Briody; William J. Streeter; Edward W. Goodman

[57] ABSTRACT

A television camera adjustment by means of a monitor picture is effected by forming a window area therein by means of which the camera operator directs the camera to a scene, the window area lines being used as an indication that an optimal adjustment has been achieved or as an indication for the operator that he must perform an adjustment procedure into one or into the other direction because it is not possible to obtain the optimal situation by means of surpassing a control range. With a color television camera the procedure can be used for a white balance adjustment combined in an advantageous manner with a black level adjustment.

12 Claims, 9 Drawing Figures

METHOD AND DEVICE FOR ADJUSTING A TELEVISION CAMERA BY MEANS OF A MONITOR PICTURE, PRIOR TO SCENE RECORDING

BACKGROUND OF THE INVENTION

The invention relates to a method for adjusting a television camera by means of a monitor picture, prior to scene recording, and to a device suitable therefor.

Before a television camera can generate a picture signal which is suitable for display, several adjustments must first be made at the camera, for example a black level adjustment when scene light is prevented from falling onto one or more opto-electronic pick-up devices present in the camera. The (picture) signal generated by the pick-up device in this, relative to the scene light, dark circumstances is a measure of the dark current at the pick-up device and during the adjustment the signal black level is made equal to a reference value, for example the ground potential.

A further adjustment may be performed for the peak-white value of the picture signal. For this purpose the camera is directed, with the diaphragm preset in the camera in a certain position, to a bright scene portion and the picture signal associated with this bright scene portion is fixed at a reference value, for example at 1 V.

In addition, a so-called white balance adjustment is performed for color television cameras, which implies that, starting from a fixed value for one of the color signals, for example a green color signal, the values of the other color signals, for example the red and blue color signals, are made equal for a more or less white scene portion to that of the green color signal. This adjustment may be performed by means of optical filters placed in the light originating from the scene and, furthermore, by means of electronic controls of the color signals.

SUMMARY OF THE INVENTION

It is an object of the invention to realize a camera adjustment by means of a monitor picture wherein an adjustment procedure to be performed by an operator is required on the one hand and, on the other hand, an automatic, electronic control takes place. A method according to the invention is therefore characterized in that during adjustment at least two spaced lines are produced in the monitor picture, each comprising at least two length-wise more or less closely spaced adjacent lines of different brightnesses, a camera adjustment to be performed in one direction being indicated by a change in one of the two said spaced lines and a camera adjustment to be performed into the opposite direction being indicated by a change in the other spaced line, whereas an ultimately proper camera adjustment is indicated by a change in both spaced lines.

A further method is characterized in that an adjustable, automatic control precedes the camera adjustment into the one or into the other direction, the occurrence of only one line change in the monitor picture being the indication that the control range of the automatic control is insufficient to achieve the ultimately proper camera adjustment in an automatic manner.

It is achieved that the monitor picture contains the information for the operator that he must perform a certain adjustment procedure, or that an optimum adjustment has been obtained.

An unambiguous indication, visible in the monitor picture, of the result of the adjustment is provided by a method which is characterized in that said change in the spaced lines in the monitor picture consists in the formation of broken lines.

A, for color television, simple method of adjusting the white balance in a color television camera comprising signal channels for color signals and color difference signals which, at white balance, are substantially at the zero value and comprising adjustable optical color filters, is characterized in that the signal information associated with the picture portion of the monitor picture located between the two spaced lines is utilized for the white balance adjustment because, when the camera is directed to a scene portion, information is derived from the color difference signal for the automatic amplification and attenuation, respectively, of color signals to obtain color difference signals of substantially zero value, a color filter adjustment into one or into the other direction being performed at the occurrence, after a short portion of time, of only one line change in the monitor picture, which indicates an insufficient control range of the automatic control, until the ultimately proper camera adjustment is obtained in an automatic manner.

A device for performing a method according to the invention is characterized in that the device comprises an adjusting circuit which includes, connected to the input thereof, a setting circuit and a detection circuit connected thereto, the setting circuit being connected to an output of the adjusting circuit which is connected to an input of an amplifier through which a gain-controlled signal is applied to the input of the adjusting circuit, while the detection circuit is implemented to detect whether the setting range of the setting circuit and control range of the amplifier, respectively, are exceeded.

A further implementation is characterized in that the adjusting circuit comprises a second detection circuit, connected to the input of the adjusting circuit, which second detection circuit detects whether the input signal is within a setting range.

A still further implementation is characterized in that outputs of the first and the second detection circuit are interconnected through logic gates for forming three logic signal combinations as indications of an optimum adjustment, the exceeding of the setting range to one side and the exceeding of the setting range to the other side.

A still further implementation is characterized in that the logic gates are connected through differentiating circuits to an input of an adding amplifier, an input of a monitor being connected to the output of this adding amplifier, another amplifier input being supplied with a video signal to be displayed.

The described devices furnish a simple implementation for performing the methods.

A device especially intended for use in color television is characterized in that the device forms part of a color television camera which comprises a filter disc with optical filters, one of the filters being a black filter, and the filter disc having a finger for operating a change-over switch, the master contact of which is connected to a push-button switch, the selection contact, associated with the finger, of the change-over switch being coupled to a black level adjusting circuit and the other selection contact being coupled to a white-balance adjusting circuit.

It is achieved that actuating the sole push-button switch results automatically in either a black level or a white balance control depending on the position of the filter disc. The advantage as compared with two separate push-button switches is that the camera operator cannot erroneously operate a switch associated with a different filter position, which would result in a disturbance instead of in an adjustment.

A further implementation is characterized in that the white-balance adjusting circuit comprises a gate for stopping the setting circuit present therein, which stopping means is operative when the white-balance adjustment is switched off.

As a result thereof the setting circuit and subsequent circuits of the white balance adjusting circuit are made inoperative when the black level adjusting circuit is actuated, while further circuits in the white-balance adjusting circuit are utilized for adjusting the black level.

DESCRIPTION OF THE DRAWINGS

The invention will be described in greater detail by way of non-limitative example with reference to the accompanying figures, wherein.

Figure 1:
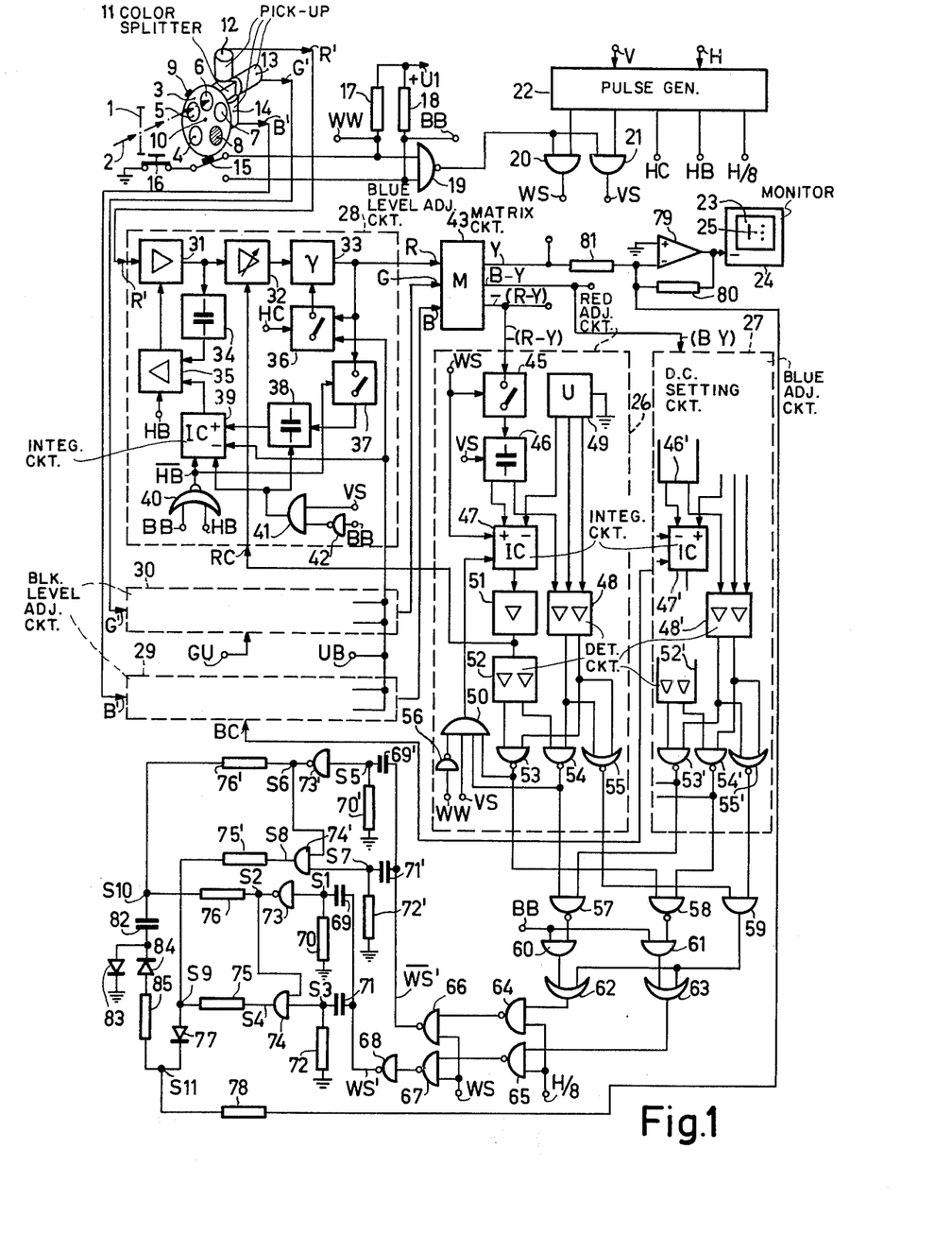
FIG. 1 is a schematic representation of a color television camera provided with a device according to the invention.

FIG. 1 shows only those components of a color television camera according to the invention which are important for explaining the invention. Reference numeral 1 denotes a diaphragm through which light 2, originating from a scene to be televised is admitted into the camera. The diaphragm 1 has, for example, five stops with which a control range of 1 to $2^5$, that is to say of 1 to 32, corresponds.

In the camera the light 2 is applied to a color splitter 11 through a filter disc 3 which has five optical filters 4, 5, 6, 7 and 8, a finger 9 and a rotary shaft 10. The light 2 originating from the scene is split in the color splitter 11 into a red, a green and a blue light beam, which are applied to opto-electronic pick-up devices 12, 13 and 14, respectively. In the pick-up devices 12, 13, and 14, which may be in the form of pick-up tubes or solid state pick-ups, the incident light is converted into electric video signals denoted by R', G', and B', respectively.

The rotary filter disc 3, which may be in one of five positions depending on which optical filter is placed in the path of light 2, has for its purpose to adapt the camera to the color temperature of the scene light and to adjust the luminous intensity in the camera which is done in conjunction with diaphragm 1. For example, the optical filter 4 may be a bright transparent filter, filter 5 a grey filter, the filter 6 may be a filter which attenuates blue light and passes relatively more red light and the filter 7 may be a filter which attenuates blue light and passes relatively more red light combined with a grey filter, while the filter 8 may be a black or opaque filter. Herewith it holds, for example, that the filters 4 and 5 are used when a color temperature range from 2500° to 4500° K. occurs at the scene and that the filters 6 and 7 are used for a color temperature range from 4000 to 18000° K., it being possible that in one of the given filter position and electronic control, still to be described hereinafter, may result in an optimal setting at the camera, for which a color, temperature of, for example, 3200° K. is mentioned.

Figure 3A:
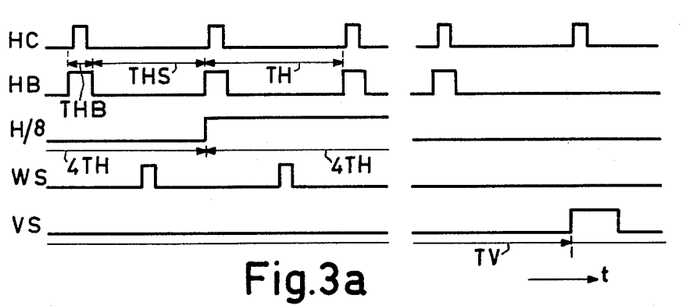
FIGS. 3a and 3b show some signal curves as a function of the time for explaining the operation of a portion of the device shown in FIG. 1.

The finger 9 on filter disc 3 is provided in such a place that when the black filter 8 is moved into the beam path of the light 2, cutting it off completely, the finger 9 operates a change-over switch 15. The master contact of the change-over switch 15 is connected through a push-button momentary contact switch 16 to ground, while two selection contacts are each connected through a resistor 17 and 18, respectively, to a terminal which carries a positive voltage +U1. The voltage U1 is, for example, equal to +5 V and is supplied by a voltage source, another terminal of which is assumed to have been connected to ground. Voltages WW and BB, respectively, are indicated at the junction of the resistors 17 and 18, respectively, with the relevant selection contact of the switch 15. These junction points furthermore are connected to the inputs of a NAND-gate 19. The output of the gate 19 is connected to an input of each of two AND-gates 20 and 21, the other inputs of which are connected to two outputs of a pulse generator 22. When a line (or horizontal) synchronization signal H and a field (or vertical) synchronization signal V, respectively, are applied to the pulse generator 22, it produces, as shown in FIG. 3a as a function of the time t, a signal HC, being a line clamping signal, a signal HB, a line blanking signal, and signal H/8, a signal which changes in a square-wave manner and has a frequency equal to ⅛ of the line frequency. A signal WS, a so-called window signal, is obtained by way of the gate 20 and a pulse-shaped changing field-frequency signal VS, which acts as a clock pulse signal and resetting signal, is obtained by way of the gate 21. In FIG. 3a TH and TV denote a line period and a field period, respectively, while THB and THS denote, respectively, a line blanking period and a line scanning period.

Figure 2:
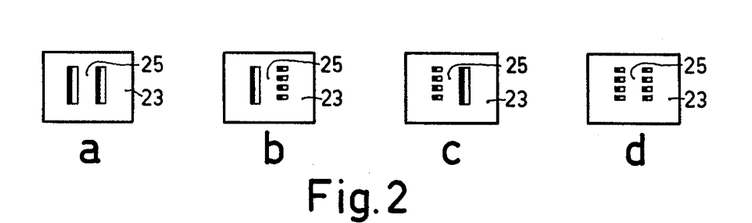
FIGS. 2a, 2b, 2c and 2d are given as illustration of the method according to the invention and show monitor pictures.
Figure 3B:
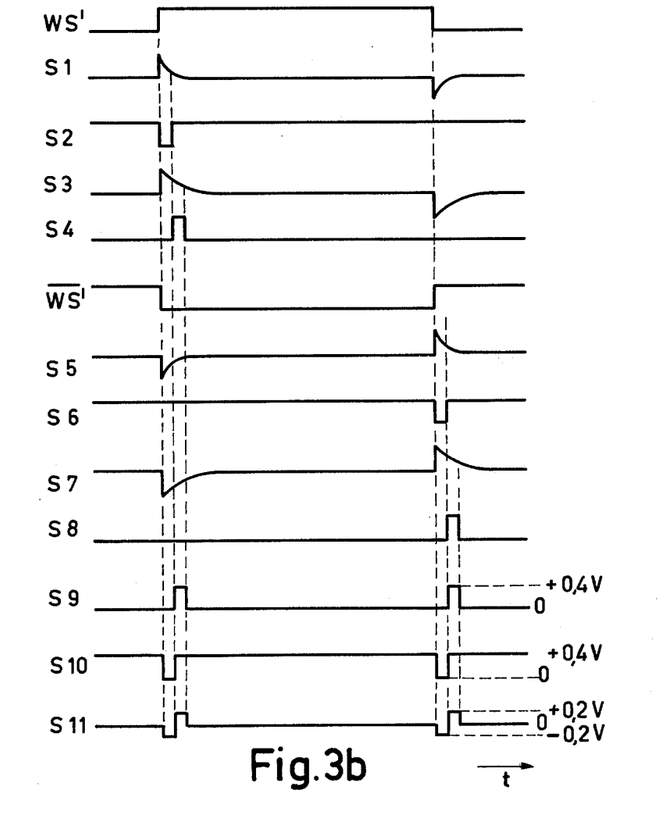

The set-up and the purpose of said window signal WS can be explained very simply with reference to FIGS. 2a and 3b. Reference numeral 23 in FIG. 2a denotes a display screen associated with a monitor, or view finder 24, given in FIG. 1. A camera operator utilizes the picture of the monitor 24 for directing the camera to the scene and for determining the size of the field of view. By means of the window signal WS some vertical, dark and/or bright lines are displayed in the picture on the monitor screen 23. To this end, in a manner still further to be described for FIG. 3b, the signal S11, shown in FIG. 3b, which signal is added to the scene picture signal for display on the monitor screen 23, is derived from the signal WS, shown in FIG. 3a, which has, for example for 32 consecutive line periods TH, a pulse of a duration of approximately 6 μs in the middle of the line scanning period THS of the line period TH. From the signal S11 of FIG. 3b and the monitor picture of FIG. 2a it appears that two spaced lines each having two length-wise more or less closely spaced adjacent lines of a different brightness are produced in the monitor picture. The picture area between the vertical lines forms a window 25 within which the (scene) picture information is utilized for adjusting purposes at the camera of FIG. 1. Depending on the greater or lesser degree of brightness of the scene information in situ of the vertical lines, the line portions of the window 25 of its lesser or the greater brightness become apparent.

The window 25, shown on the monitor screen 23 of FIG. 2a, is not only used for marking the scene portion whose information is used for adjusting purposes but is also used to indicate, on the one hand, into which direction the camera operator must perform an adjusting procedure and, on the other hand, that an optimal adjustment has been achieved in an automatic manner within a certain control range.

Two adjusting possibilities are indicated by way of example in the camera shown in FIG. 1, one possibility excluding the other one so that the operator cannot make a mistake when selecting the adjusting possibility. The change-over switch 15, operating with the finger 9 of the filter disc 3, and the push-button switch 16 have been provided for this purpose. Pressing the push-button switch 16 for a few seconds activates, in a manner still further to be described, either an automatic white-balance control circuit (26, 27) which includes a red and a blue adjusting circuit 26 and 27, respectively, if one of the filters 4, 5, 6 or 7 is in the beam path of the light 2, or an automatic black level adjusting circuit 28 if the black filter 8 interrupts the beam path of the light 2. Special emphasis is put on the fact that both adjustments can be performed by means of the sole push-button switch 16, the white-balance or the black-level adjustment being done dependent of the position of the filter disc 3, so that the operator cannot perform an incorrect procedure, for example the activation of the black level adjustment while the scene light is not cut-off.

It will become apparent that for the white-balance adjustment, a ±3 dB automatic control of a signal amplifier can be effected in an optimal manner at a given position of the filter disc 3. If, however, the optimal adjusting point, which corresponds with an indication as shown in the monitor picture of FIG. 2d, in outside the automatic control range so that the operator must move another filter of the filter disc into the beam path of the light 2, the monitor picture as shown in FIG. 2b or FIG. 2c appears, which is an indication for the operator that a color filter in the filter disc 3 has either been moved out of or into the beam path.

From the description of the black level adjustment it will be clear that only the monitor pictures as shown in FIGS. 2a and 2d are utilized. In addition, if the picture shown in FIG. 2d has not been produced after approximately 2.5 s sec., this is an indication that there is an error in a black level circuit which occurs outside the adjustment.

The detailed description of the camera shown in FIG. 1 uses, as the starting point, the position of the switches 16 and 15 shown in the drawing; the voltage WW is equal to ground potential and the voltage BB is equal to $+U1 = +5$ V corresponding, respectively, with a logic 0 and a logic 1. The voltage WW with the logic 0 implies; the white-balance adjusting circuit (26, 27) is operative and produces two controllable amplifier setting voltages RC and BC to an automatic black level control circuit 28 and 29, respectively. The circuits 28 and 29 and a further circuit 30 are implemented in an identical manner, but for fact, however, that the circuit 30 is not supplied with a controllable amplifier setting voltage but with a preset d.c. voltage GU.

The operation of the circuits 28, 29 and 30, connected respectively to the outputs of the pick-up devices 12, 14 and 13 which produce the respective signals R', B' and G', will be described with reference to the circuit 28. In the circuit 28 the signal R' is applied to a series arrangement of three amplifiers, namely a preamplifier 31, an adjustable amplifier 32 and a gamma amplifier 33. The gain of the amplifier 32 is determined by the controllable amplifier setting voltage RC. A black level control circuit which is negatively fed back in known manner and comprises an integrating circuit 34, a switched-mode amplifier 35 and a clamping circuit 36, is provided at the preamplifier 31 and the gamma amplifier 33. The black level control circuit furnishes in known manner the so-called stray light or flare compensation. Herein the integrated output signal of the preamplifier 31, which is a measure of the stray light, is utilized, after having been compared with a reference voltage, for a negative feedback with a pulse height control in the line blanking periods THB of the line blanking signal HB which is applied to the switched-mode amplifier 35. The clamping circuit 36 at the gamma amplifier 33 is also implemented in a known manner, the output signal of the gamma amplifier 33 being clamped, by the application of the clamping signal HC, at a black level reference voltage UB applied to the circuit 36, during a portion of the line blanking periods THB.

Figures 4, 5:
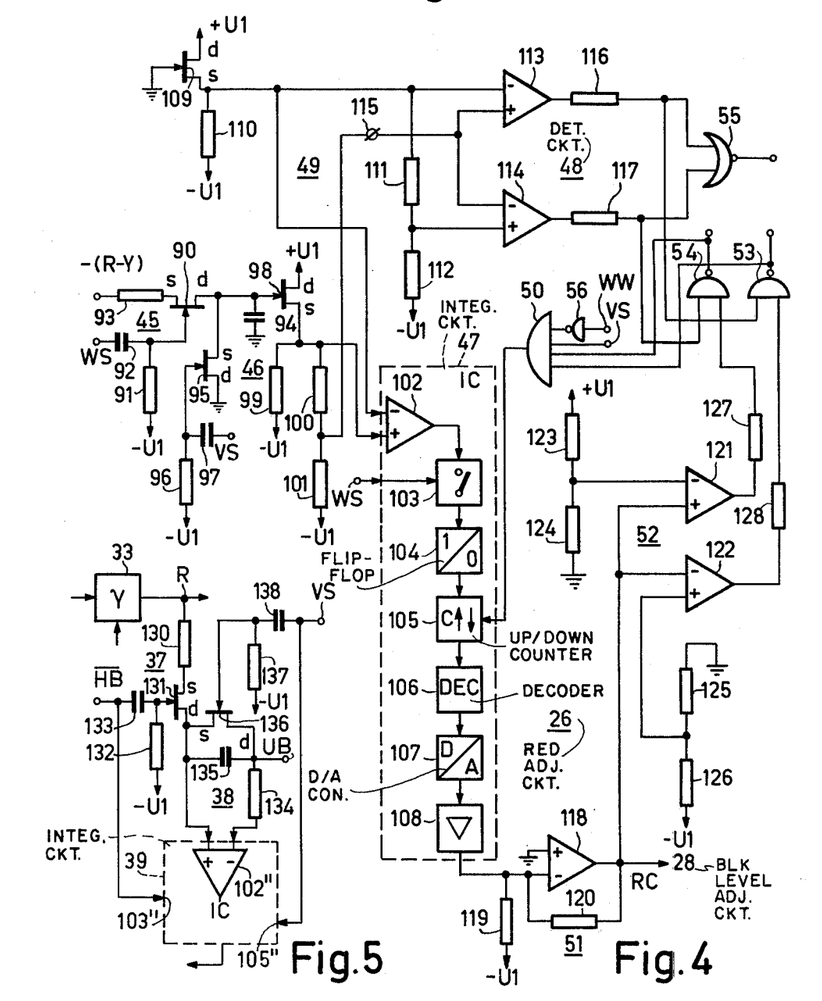
FIG. 4 is a detailed view of an implementation shown block schematically in FIG. 1, of a portion of a white-balance adjusting circuit.
FIG. 5 shows in detail an implementation, shown block schematically in FIG. 1, of a portion of a black-level adjusting circuit.

As indicated hereinbefore the described black level circuits are known per se so that no further details need be given. This does not apply to the additional series arrangement connected to the output of the gamma amplifier 33 and provided with a gate circuit 37, an integrating circuit 38 and a setting circuit 39. FIG. 4 shows the detailed construction (IC) of the setting circuit (39), which is implemented as an integrated circuit, while FIG. 5 shows the implementation of the circuits 37 and 38 in further detail. For the connections at the circuit (37, 38, 39) it holds that the gate circuit 37 is supplied with an inverted line blanking signal $\overline{HB}$ as the switching signal and the integration circuit 38 with the signal VS of the field frequency as the resetting signal. The signal $\overline{HB}$ is supplied by a NOR-gate 40 to inputs of which the voltage BB and the signal HB are applied. The signal VS is produced by an AND-gate 41 to which the signal VS and, through an inverter 42, the voltage BB is applied. In addition, the output signals of the gates 40 and 41 are applied to control inputs of the circuit 39. The circuit 39 is provided with a comparator, not shown, whose (+) input is connected to the output of the circuit 38 and to whose (−) input the black level reference voltage UB is applied. The output of the circuit 39 is connected to a reference input of the amplifier 35.

In the preceding it was assumed that the voltage WW is equal to the logic 0 and the voltage BB to the logic 1. In this assumption in which the voltage BB is equal to the logic 1, it holds that the gates 40 and 41 are both cutoff and the outputs carry the logic 0. In correspondence therewith, the circuit (37, 38, 39) is not switched-on for adjusting purposes but it is assumed that the output of the circuit 39 has such a reference voltage that the black level in the output signal of the gamma amplifier 33 is at the desired value, for example ground potential.

The output signals R, G and B of the respective circuits 28, 29 and 30, present in the signal channels which follow the pick-up devices 12, 13 and 14, are applied to inputs of a matrix circuit (M) 43. Three signals are formed in known manner in the matrix circuit: a luminance signal Y, a color difference signal B−Y and a color difference signal −(R−Y), which signals can be further processed and utilized in known manner in subsequent signal channels. Instead of the signal −(R−Y), the signal (R−Y) may be assumed to be composite. In view of a practical implementation of the matrix circuit 43 the choice illustrated in FIG. 1 is suggested. It holds, for example, that the luminance signal Y=0.3 R+0.59G+0.11B. It follows that if R=G=B also Y is equal thereto, or, put differently: in a white scene portion for which it holds that R=G=B the color difference signals −(R−Y) and B−Y must both be equal to zero. For the white balance adjustment this implies that the operator direct the camera to the scene to be televized in such a way that a scene portion of a more or less white color is incident on the monitor screen 23 within the window 25 and thereafter depresses the push-button switch for a period of time. The description of the operation of the adjusting circuits 26 and 27 has this situation as the starting point.

The color difference signal −(R−Y) is applied to an input of the circuit 26, In the circuit 26 the signal −(R−Y) is applied to a gate circuit 45, to which the window signal WS is applied as the switching signal. During the positively directed pulses in the window signal WS of FIG. 3a, the gate circuit 45 is conductive so that the signal −(R−Y) is applied to an integrating circuit 46 to which the field-frequency signal VS, shown in FIG. 3a, is also applied as the resetting signal. An output of the circuit 46 is connected to the (+) input of a setting circuit 47, which is implemented as an integrated circuit (IC), while another output is connected to an input of a detection circuit 48. Two other inputs of the circuit 48 and a (−) input of the circuit 47 are connected each to a different output of a d.c. setting circuit (U) 49. The circuit 47 has the signal WS directly applied to it as the switching signal, the field-frequency signal VS which operates as the clock signal, being applied to it through an AND-gate 50. Via an amplifier 51, the output of the circuit 47 is connected to the input of a detection circuit 52 and applies, furthermore, the controllable amplifier setting voltage RC to the circuit 28. Each of the circuits 48 and 52, shown in detail in FIG. 4, comprises a first and a second output, the first and the second output, respectively, of the circuit 52 being connected to an input each of NAND-gates 53 and 54, respectively, to a further input of which the second and the first output, respectively, of the circuit 48 are connected. The outputs of the circuit 52 are furthermore connected to inputs of a NOR-gate 55. The outputs of the gates 53 and 54 are connected to inputs of the gate 50, to further inputs of which the field-frequency signal VS is applied directly and the voltage WW through an inverter 56. The outputs of the gates 53, 54 and 55 constitute three outputs of the circuit 26.

The circuit 27 to which the signal B−Y is applied is implemented with the same components as the circuit 26, but some connections have been made differently. There is a circuit 47', the connections to its (+) and (−) inputs being interchanged, and there are gates 53' and 54', whose inputs are connected to the two first and second outputs, respectively, of the circuits 52' and 48'. The connections are interchanged in view of the supply of the signals −(R−Y) and (B−Y). Circuit 27 supplies the voltage BC to the circuits 29 in the same manner as circuit 26 supplies the voltage RC to the circuit 28.

FIG. 1 shows that the outputs of the gates 54 and 53' are connected to inputs of a NAND-gate 57. The gates 53 and 54' are coupled to a NAND-gate 58. the outputs of the gates 55 and 55' are connected to inputs of an AND-gate 59. The outputs of the gates 57 and 58, respectively, are connected to input each of AND-gates 60 and 61, to the other inputs of which the voltage BB is applied. The output of the gates 60 and 61, respectively, are connected to an input each of OR-gates 62 and 63, the other inputs of which are connected to the output of the gate 59. The output of the gates 62 and 63, respectively, are connected each to an input of NAND-gates 64 and 65, to the other inputs of which the signal H/8 is applied. The output of the gates 64 and 65, respectively, are connected each to an input of NAND-gates 66 and 67, to the other inputs of which the signal WS is applied. The output of the gate 66 carries a signal $\overline{WS'}$, while the output of an inverter 68, which follows immediately after the gate 67, carries a signal WS', which signals, along with signals S1 to S11 derived therefrom, are plotted in FIG. 3b as a function of the time t. It should be noted that the signals shown in FIGS. 3a and 3b are not on the same amplitude scale and that they have only been schematically plotted versus the time.

The output of the inverter 68 is connected to ground through a capacitor 69 and a resistor 70, thus forming a first differentiating circuit (69, 70) having a small time constant. In addition, the output of the inverter 68 is connected to ground through a second differentiating circuit (71, 72) which has a time constant which is approximately twice as high. By way of example, it is assumed that the capacitance of the capacitors 69 and 71 is +470 pF and the value of the resistor 70 is 2200 Ohms and that of the resistor 72 is 4700 Ohms, resulting in respective time constants of approximately 1 and 2.2 μs. The signals occurring at the capacitor-resistor junctions are plotted in FIG. 3b as S1 and S3. The signal S1 is applied to the input of an inverter 73 which is connected at the output thereof, at which the signal S2 occurs, to an input of an AND-gate 74 to whose other input the signal S3 is applied, so that the output carries the signal S4. In a similar manner the output of the gate 66 carrying the signal $\overline{WS'}$ is connected to two differentiating circuits (69', 70') and (71', 72'), an inverter 73' and an AND-gate 74', the signals S5, S6, S7 and S8, shown in FIG. 3b, being produced. The outputs of the gates 74 and 74' with the signals S4 and S8 are interconnected through resistors 75 and 75'; the junction carrying the signal S9 of FIG. 3b. Likewise the outputs of the inverters 73 and 73' are interconnected by means of resistors 76 and 76'; the junction carrying the signal S10. The junction with the signal S9 is arranged, through the anode-cathode path of a diode 77, in series with a resistor 78 to the (−) input of a differential amplifier 79, which is connected through a negative feedback resistor 80 to the amplifier 79 output. The amplifier 79 is also connected to ground by means of its (+) input. The (−) input of the amplifier 79 is furthermore connected through a resistor 81 to the output of the matrix circuit 43 which carries the luminance signal Y, while the amplifier 79 output is connected to a (−) input of the monitor (or viewfinder) 24. An adding amplifier (78-81) is thus formed. The junctions with the signal S10 is connected to ground through a capacitor 82 and the anode-cathode path of a diode 83. The junction of the capacitor 82 and the diode 83 is connected, through the cathode-anode path of a diode 84 in series with a resistor 85 to the junction of the diode 77 and the resistor 78. FIG. 3b shows the signal S11 thus formed from the signals S9 and S10. Relative to the ground potential, the signal S11 has +0.2 V and −0.2 V-going pulses which, relative to, for example, a peak-peak value in the signal Y of 0.6 V, furnish a sufficiently bright and/or dark marking of the scene portion in the monitor picture 23 depending on the brightness of the scene information in situ of the vertical lines.

The operation of the white-balance adjusting circuit (26, 27) of FIG. 1 will be explained with reference to the detailed example of the circuit 26 shown in FIG. 4. Components used in FIG. 1 have been given the same reference numerals in FIG. 4.

The gate circuit 45 shown in FIG. 1, to which the signal −(R−Y) is applied, is implemented in FIG. 4 with a transistor 90 of the type having an insulated gate electrode, the remaining transistors still to be specified hereinafter are also of this type. The gate electrode is connected to a terminal which carries a negative voltage −U1 through a resistor 91 and to the window signal WS through a capacitor 92. The signal −(R−Y) is applied through a resistor 93 to the source (s) of the transistor 90, whose drain (d) is connected to ground through a capacitor 94. The junction of the capacitor 94 and the transistor 90 is connected to ground through the source-drain path of a transistor 95 and the gate electrode thereof is connected to the terminal having voltage −U1 through a resistor 96, and to the field-frequency signal VS, which operates as the resetting signal, through a capacitor 97. The brief pulses in the signals WS and VS, shown in FIG. 3a, render the transistors 90 and 95 conductive. In response thereto the capacitor 94 integrates the signal −(R−Y) during the occurrence of the pulses in the window signal WS. Depending on the signal integration, the voltage across the capacitor 94 is zero, positive or negative, after the last pulse in the window signal WS has ended. A capacitor voltage equal to oV, that is to say the ground potential is present at the (possibly) voltage-carrying capacitor terminal, implies that, on the average, the signal −(R−Y), considered across the entire window area 25 of the monitor screen 23, was equal to zero, or it holds, on the average, that signal R=signal Y. Signal R being smaller than signal Y, on an average, ultimately results in a positive voltage across the capacitor 94 and signal R being greater than signal Y, on an average, results in a negative capacitor 94 voltage.

It is now assumed that at the end of the last pulse in the window signal WS, a positive voltage of, for example, 50 mV is present across the capacitor 94, meaning that signal R is somewhat too small. The voltage-carrying capacitor 94 terminal is connected to the gate electrode of a transistor 98, whose drain is connected to the terminal having the voltage +U1, the source being connected through a resistor 99 and in parallel through two series resistors 100 and 101 to the terminal having the voltage −U1. The transistor 98, arranged as a source follower, has the source electrode, with the voltage of 50 mV minus the gate-source threshold voltage thereon, further connected to the (+) input of the setting circuit 47 which is implemented as an integrated circuit (IC), namely or, more specifically to the (+) input of a comparator 102 present therein whose (−) input is connected to an output of the voltage setting circuit 49. The output of the comparator 102 is followed in the circuit 47 by a series arrangement of a gate circuit 103, to which the window signal WS is applied as the switching signal, a flip-flop (1/0)104, a 128-step up-and-down counter (C) 105, to which the field frequency signal VS is applied as the clock signal, a decoder (DEC) 106, a digital-to-analog converter (D/A) 107 and a current amplifier 108.

In the voltage setting circuit 49 the (−) input of the comparator 102 is connected to the source of a transistor 109 which is further connected to the terminal having voltage −U1 through a resistor 110. The gate electrode of transistor 109 is connected to ground and the drain thereof to the terminal having the voltage +U1. It appears that the source of the transistor 109 has the ground potential minus the gate-source threshold voltage. In the circuit 49 the source electrode of the transistor 109 is further connected to the terminal having voltage −U1 through two series resistors 111 and 112, the source further being connected to the (−)input of a differential amplifier 113, the junction of the resistors 111 and 112 being connected to the (+) input of a differential amplifier 114. The (+) input of the amplifier 113 and the (−) input of the amplifier 114 are interconnected and are connected to the junction of the resistors 100 and 101 through a terminal 115. Through respective resistors 116 and 117, the outputs of the amplifiers 113 and 114 are connected to inputs of the NOR-gate 55, and to an input each of the NAND-gates 53 and 54, respectively.

The detection circuit 48 operates as a balanced detector. The supply of the ground potential minus the gate-source threshold voltage (of transistor 109) to the (−) input of the amplifier 113 and of a, for example, 20 mV lower voltage (via voltage divider 111, 112) to the (+) input of the amplifier 114, results in that, when a voltage which is situated between said two values is applied via the terminal 115, the two amplifiers 113 and 114 produce a negative output voltage. If a voltage having a value above the ground potential minus the gate-source threshold voltage is applied via the terminal 115, the amplifier 113 produces a positive output voltage and the amplifier 114 a negative output voltage. Applying a voltage having a value below the ground potential minus the gate-source threshold value and minus the 20 mV causes the amplifier 113 to produce a negative output voltage and the amplifier 114 to produce a positive output voltage. It is assumed that the negative and the positive voltages, respectively, correspond to a logic 0 and a logic 1, respectively. As a result gate 55 produces a logic 1, that is to say both amplifiers produce the logic 0, only when the voltage applied via the terminal 115 falls within the preset 20 mV range, while at a higher value the amplifiers 113 and 114 produce the logic 1 and 0, respectively, and, at a lower value, the logic 0 and 1, respectively.

It is now assumed that the voltage division across the resistors 100 and 101 is so great that in the presence of the ground potential at the gate electrode of the transistor 98 and, consequently, this voltage minus the gate-threshold voltage at the source thereof, the voltage at the junction of the resistors 100 and 101 and, consequently, at the terminal 115 is another 10 mV lower. Thus, a symmetrically balanced detection is effected in the detection circuit 48.

It is assumed that a small positive voltage of 50 mV is present across the capacitor 94 (the signal R is too small). The result is that, on the one hand the detection circuit 48 detects via the terminal 115 that a voltage is present which exceeds the preset range of 20 mV (logic 1 and 0 as the respective output signals of the amplifiers 113 and 114) and, on the other hand, the voltage at the (+) input of the comparator 102 is 50 mV more positive than at the (−) input. This 50 mV more positive voltage, occurring at the end of the last pulse in the window signal WS, produces a positive voltage at the input of the flip-flop 104 via the gate 103, which no longer conducts after the end of this pulse. It is assumed that the flip-flop 104 produces the logic 1 and 0, respectively, as the output signal, when a positive or negative voltage, respectively, is applied to it. The above-mentioned positive voltage supply (signal R is too small) consequently results in a logic 1 at the output of the flip-flop 104. It is assumed that the signal VS, shown in FIG. 3a, becomes available via the gate 50 for the 128-step up/down counter 105. The pulse in the field-frequency signal VS operates as a clock signal at the up/down counter 105, an increase and decrease, respectively, of the counter position by one unit step being produced when the flip-flop 104 carries a logic 1 or 0 as the output signal. In response thereto the counter 105 increases the counter position by one unit step. In the decoder 106 the increased counter position is decoded and the subsequent digital-to-analog converter 107 supplies an increased analog signal. In response thereto, the current amplifier 108 supplies a higher current to the output of the circuit 47, which means that the signal R is too small, or in other words, the signal $-(R-Y)$ is positive.

Connected to the output of the circuit 47, there is the amplifier 51 which is provided with a differential amplifier 118 the (+) input thereof being connected to ground and the (−) input thereof to the output of the amplifier 108. The (−) input is further connected, via resistors 119 and 120, respectively, to the terminal having the voltage $-U1$ and the amplifier 118 output, respectively. The output of the amplifier carries the controllable amplifier setting voltage RC to be supplied to the circuit 28 shown in FIG. 1, or more particularly to the controllable amplifier 32 present therein. It is assumed that increasing the position of counter 105 (indication: signal R is too small) results in such a change in the amplifier setting voltage RC that the gain factor of the amplifier 32 is increased. The result is a certain increase of the signal R. The measurement of the signal $-(R-Y)$, performed in the next field period by means of the window signal WS, results in a positive voltage difference smaller than 50 mV between the (+) and (−) input of the comparator 102, the position of the counter 105 being again increased by one unit step at the end of the field period. It appears that each field period of the counter 105 will change the counter position by one unit step until the amplifier 32 has such a gain factor that the voltage between the (+) and (−) input of the comparator 102 has become substantially zero. It should be noted that already prior to this instant, the voltage at the terminal 115 has arrived within the setting range (20 mV) of the detection circuit 48 at which the output of the gate 55 will start carrying the logic 1. From the following it will appear that the output signal having the logic 1 of the gate 55 (and this together with the logic 1 of the gate 55′ of FIG. 1) results in an indication that proper adjustment has been obtained.

A similar operation, as described for the circuit 26, occurs in the circuit 27 of FIG. 1, but for a polarity difference, to which the signal (B−Y) is applied. An integration of the signal (B−Y), resulting in a positive voltage, in the circuit 46′ now implies that the signal B is too large. Because the positive output voltage of the integration circuit 46′ is applied to the (−) input of the circuit 47′, a negative voltage becomes available for the flip-flop (104′) in the circuit 47′ and each field period the counting position of the counter (105′) will decrease one unit step. The result is that the circuit 27 changes the controllable amplifier setting voltage BC so that the gain of the circuit 29 decreases (by means of the controllable amplifier present therein).

From the preceding it appears that activating the push-button switch 16, with the change-over switch 15 in the position shown in FIG. 1, results in an automatic adjustment of the white balance which must satisfy the condition that signal R−Y=signal B−Y=0. The following applies to this automatic control: the up/down counter 105 of FIG. 4 has a counting capacity of 128 steps from which it follows that the current to be supplied by the current amplifier 108 can vary from a minimum current to a maximum current in 128 steps and vice versa. In a practical implementation the setting voltage RC (BC, respectively) has, for example, a voltage value of +1.25 V for the 0-counting position and of −1.25 V for the 128-counting position. For the gain factor of the amplifier 32 in FIG. 1 this means, for example, an attenuation of −3 dB and a gain of +3 dB. In practice the ±3 dB control of the amplifier 32 at a certain position of the filter disc 3 of FIG. 1 appears to be very satisfactory. The 128 counting positions cover an amplifier control range of 6 dB, which furnishes an average of approximately 0.05 dB for each change of the counting position, which corresponds with an average accuracy per counting position change of 0.6%. The example of a 20 mV setting range mentioned in the description of the detection circuit 48, corresponds to 4 to 5 counting positions, from which it follows that a change of a few counting positions does not disturb the indication of an optimum adjustment (monitor picture FIG. 2d), while this indication is already given when the adjustment has come within an accuracy of 1.5%.

It appears that there are positions of the filter disc 3 in FIG. 1 in which the automatic adjustment via the circuits 26 and 27 indeed starts, but the optimal white-balance adjustment with signal (R−Y)=signal (B−Y)=0 cannot be achieved by means of the limited ±3 dB control range. The up/down counter 105 of FIG. 4 is then moved to the 0-counting position (−3 dB or +1.25 V at the output of the amplifier 118) or to the 128-counting position (+3 dB or −1.25 V at the output of the amplifier 118). Since in the most unfavorable case the counter 105 must cycle through all 128-counting positions, it follows that the end of the range is reached after a maximum of 2.56 sec. in case of a 50 Hz field frequency or after 2.13 sec. in the case of a 60 Hz field frequency. For the end-of-range detection, the circuits 26 and 27 comprise the detection circuits 52 and 52′ the detection circuits 48 and 48′ giving a further indication at which end of the control range the end-of-range situation occurs.

FIG. 4 shows that the output of the amplifier 118 is connected to the (+) input of a differential amplifier 121 and the (−) input of an amplifier 122. The (−) input of the amplifier 121 is connected to the junction of two resistors 123 and 124, arranged in series between the terminal having voltage +U1 and ground. The (+) input of the amplifier 122 is connected to the junction of two resistors 125 and 126, which are arranged in series between ground and the terminal having voltage −U1. The outputs of the amplifiers 121 and 122, respectively, are connected through resistors 127 and 128, respectively, to an input each of the NAND-gates 54 and 53, respectively. The outputs of the gates 53 and 54 are further connected to inputs of the AND-gate 50.

The operation of the detection circuit 52 of FIG. 4 will now be described. At a value of the voltage RC of between +1.25 V and −1.25 V (that is to say it is within the control range) wherein these voltages are present through the voltage dividers (123, 124) and (125, 126), respectively, at the (−) input of the amplifier 121 and the (+) input of the amplifier 122, respectively, the amplifiers 121 and 122 both supply a negative voltage, i.e. a logic 0. In response thereto the gates 53 and 54 are blocked and produce each a logic 1 as the output signal, while the gate 50 is rendered conductive, so that at the chosen white balance control (WW=logic 0) the clock signal VS of the field frequency puts the counter 105 into operation. If in these circumstances the voltage at the terminal 115 comes within the range of 20 mV, adjusted at the amplifiers 113 and 114, that is to say that the adjustment is optimal, as described above, the gate 55 supplies the logic 1. Referring to FIG. 1 it follows that at the optimal adjustment where signal (R−Y)=-signal (B−Y)=0, the gates 55 and 55′ both produce the logic 1, so that then only the AND-gate 59 produces the logic 1. The gates 53 and 54 (and the same applies to the gates 53′ and 54′) then give the logic 1. In response thereto the NAND-gates 57 and 58 give the logic 0, which cause the AND-gates 60 and 61 to be cut-off and the logic 0 to be applied to the OR-gates 62 and 63, which receive the logic 1 from the gate 59 and pass it on to the NAND-gates 64 and 75, thus rendering these gates conductive. The result is that the signal H/8 shown in FIG. 3a, occurs inverted at the outputs of the gates 64 and 65 and the input of the NAND-gates 66 and 67. Since the window signal WS has, in each field scanning period during 32 line periods, pulses occurring in the center of the line scanning period and is applied to the gates 66 and 67, the result is that during 4TH line periods, the gates 66 and 67 pass the signal WS in an inverted manner, whereafter the gates 66 and 67 are cutoff during 4TH line periods by the signal H/8, whereafter they are rendered conductive again and thereafter cut-off again. This results in that the monitor picture shown in FIG. 2d is produced on the monitor screen 23, which is an indication for the operator that the white-balance adjustment has been performed in an optimal manner.

At the appearance of the monitor picture, shown in FIG. 2d, the camera operator may release the push-button switch 16. The result is that the logic 1 occurs at both inputs of the NAND-gate 19 in FIG. 1, which gives the logic 0 at its output so that the AND-gates 20 and 21 are cut off. The signals WS and VS are now no longer produced. The counter 105 of FIG. 4 retains its counting position associated with the optimal adjustment, which also applies to the value of the amplifier setting voltage RC (and BC). Further, only the signals HC, HB and H/8 are taken from the pulse generator 22, the signals HC and HB being required to enable operation of the camera, while the signal H/8 does no longer affect the operation of the camera circuits.

Now the situation will be considered in which the automatic control range is not sufficient for attaining the white balance. First it is assumed that the integrated signal −(R−Y) across the capacitor 94 of FIG. 4 results in such a large positive voltage that the setting range at the detection circuit 48 is exceeded in the positive direction in response whereto an output signal of the amplifier 113 and 114, respectively, is obtained which has the logic 1 and the logic 0, respectively, in FIG. 4. From this it can be derived that, signal R being much too small, the voltage RC at the output of the amplifier 118 of FIG. 1 has the value −1.25 V. As a result the logic 0 and the logic 1, respectively, appear in the output signal of the amplifier 121 and 122, respectively. It follows that the NAND-gate 53 receives the logic 1 from both amplifiers 122 and 113, resulting in the logic 0 at the output of the gate 53. The logic 0, originating from the gate 53, inhibits the AND-gate 50, so that no clock pulses of the signal VS are applied to the counter 105. The output of the gate 54 carries the logic 1, the output of the gate 55 carries the logic 0. The combination of the logic values at the output of the gates 53, 54 and 55, equal to 0, 1, 0, is the indication that the signal R is too small and that the limit of the control range has been reached.

Secondly, it is assumed that the integrated signal −(R−Y) results in an excessive negative voltage across the capacitor 94 of FIG. 4, that is to say the signal R is too large for the adjusting and control range. The amplifiers 113 and 114 produce the logic 0 and 1, respectively. The voltage RC equal to +1.25 V causes the amplifiers 121 and 122 to produce the logic 1 and 0, respectively. Consequently the gates 53, 54 and 55 carry at their outputs the combination 1,0,0 which is the indication that the signal R is too large and that the limit of the control range has been reached.

For completeness, it should be noted that the combination, equal to 1,1,1 at the outputs of the gates 53, 54 and 55 is associated with the optimal adjustment already described hereinbefore.

The description of the circuit 27 of FIG. 1 states that, compared to the circuit 26, some connections were interchanged and that the signal (B−Y) is applied instead of the signal −(R−Y). The result is that with an integrated signal (B−Y) which is too high in the positive sense (signal B is much too large), the voltage BC has the value +1.25 V, while BC=−1.25 V is associated with the situation that the signal B is much too small for the control range. In addition, the inputs of the gate 53′ are not connected to outputs of comparable amplifiers 113′ and 122′, but to the outputs of amplifiers 114′ and 122′. It holds for the gate 54 that the inputs thereof are connected to outputs of amplifiers 113′ and 121′. A derivation, given hereinbefore, for the logic combination at the output of the gates 53′, 54′ and 55′ of FIG. 1 gives that the combination 1,0,0 is the indication that the signal B is too large and that the limit of the control range has been reached, while the combination 0,1,0 is the indication that the signal B is too small and that the limit of the control range has been reached.

The following table is a survey of the various combinations:

TABLE

| signal R | gates 53 | 54 | 55 | signal B | gates 53′ | 54′ | 55′ |
|---|---|---|---|---|---|---|---|
| too small | 0 | 1 | 0 | too large | 1 | 0 | 0 |
| too large | 1 | 0 | 0 | too small | 0 | 1 | 0 |
| good | 1 | 1 | 1 | good | 1 | 1 | 1 |

From FIG. 1 and the table it appears that the NAND-gate 57, which is connected to the outputs of the gates 54 and 53′ produces a logic 1 in the case where signal R is too large and/or signal B is too small. The NAND-gate 58, which is connected to the outputs of the gates 53 and 54′ produces a logic 1 in the situation that signal R is too small and/or signal B too large. The AND-gate 59, connected to the outputs of the gates 55 and 55′, produces the logic 1 in the situation that the signals R and B are of the proper size.

As described hereinbefore, the logic 1 produced by the gate 59 results in that the monitor picture shown in FIG. 2d is produced by means of the OR-gates 62 and 63 and the NAND-gates 64, 65, 66 and 67. From this it follows that in the situation where signal R is too large and/or signal B too small, only gate 57 produces a logic 1, this gate influencing, via the gates 60, 62, 64 and 66, only the signal $\overline{WS'}$ of FIG. 3b, which implies that the monitor picture shown in FIG. 2b is produced. However, in the situation that signal R is too small and/or signal B too large, only gate 58 producing a logic 1, this gate influences, via the gates 61, 63, 65 and 67, the signal WS' shown in FIG. 3b, so that the monitor picture shown in FIG. 2c is produced.

If, during white balance adjustment, the camera man sees the monitor picture shown in FIG. 2b or 2c within approximately 2.5 s, this is an indication to him that he must move another filter of the filter disc 3 of FIG. 1 in front of the lens into the one or the other direction, depending on the monitor picture. For the described implementation of the filter disc 3, which has the bright transparent filter 4, the grey filter 5, the filter 6 which attenuates blue light and passes relatively more red light, and the filter 7 which attenuates the blue light and passes relatively more red light in combination with a grey filter, it follows that to obtain more blue light if the signal B is too small and the monitor picture shown in FIG. 2b is produced, a filter of a lower number must be moved into the light path. If the monitor picture shown in FIG. 2c is produced this indicates that a filter of a higher number must be moved into the light path.

The preceding describes that the monitor pictures as shown in FIGS. 2a and 2d may be further utilized for a black level adjustment, when the black filter 8 is moved into the light path. It then holds that the voltages WW and BB, respectively, correspond to the logic 1 and the logic 0, respectively. From FIG. 1 it follows that the gate 50 is cut-off by means of the inverter 56 so that the circuit 47 (and also 47') are not affected and the counter 105 of FIG. 4 retains its counting position. In addition, the AND-gates 60 and 61, being provided with the voltage BB corresponding to the logic 0, are cut-off so that any logic 1 at the output of the gate 57 or 58 has no further influence. The following circuits of the circuit 26 (and 27) are utilized for the black level adjustment: the gate circuit 45, the integrating circuit 46, the detection circuit 48, the voltage setting circuit 49 and the gate 55.

In the automatic black level adjusting circuit 28, the voltage BB with the logic 0 makes the gate circuit 37, the integration circuit 38 and the setting circuit 39 operative by applying its signal to the gate 41 through the inverter 42 and to the gate 40. The setting circuit 39 is identical to the circuit 47 which is shown in detail in FIG. 4. FIG. 5 shows the gate circuit 37 and the integrating circuit 38 in detail.

FIG. 5 shows that the output of the gamma amplifier 33 is connected through a resistor 130 to the source of a transistor 131. The gate electrode of the transistor 131 is connected through a resistor 132 to the terminal having the voltage $-U1$, while the inverted line blanking signal $\overline{HB}$ is applied to the gate electrode through a capacitor 133. The drain of the transistor 131 is connected to the (+) input of a comparator 102" provided in the circuit 39, which is implemented as an integrated circuit (IC). The (−) input of the comparator 102" is connected to the (+) input thereof through a resistor 134 in series with a capacitor 135. The junction of the resistor 134 and the capacitor 135 is connected to a terminal to which the black level reference voltage UB is applied and to the drain of a transistor 136, whose source is connected to the other capacitor 133 junction at the (+) input of the comparator 102". The gate electrode of the transistor 136 is connected through a resistor 137 to the terminal having the voltage $-U1$ and the signal VS of the field frequency is applied thereto through a capacitor 138. The signals $\overline{HB}$ and VS are further applied to inputs of the circuit 39 to which the gate circuit 103" and the up/down counter 105", respectively, both not shown in the drawing, are connected.

The black level adjusting circuit shown in FIG. 5 operates as follows. Activating the push-button switch 16 of FIG. 1, when the black filter 8 is moved in the camera into the light path, causes the signal $\overline{HB}$ and VS to perform their function. The transistor 131 conducts during the line scanning periods THS in the field scanning period, so that the signal R is integrated by the capacitor 135. Since the pick-up device 12 (and 13 and 14) is in the dark because of the shielding black filter 8, the signal R is a measure of the dark current occurring at the pick-up device 12. The integration takes place relative to the desired black level (reference) voltage UB. At the end of the last line scanning period, in the field scanning period the integrated voltage across the capacitor 135 is stored, in the manner described for circuit 47 of FIG. 4, in the flip-flop 104" (not shown). At the end of the field period the pulse in the signal VS occurs, which acts as the clock pulse at the up/down counter 105" and, via the transistor 136, as the resetting pulse at the capacitor 135. Depending on the increased or decreased counting position, the circuit 39 applies an increased or decreased current to the black level control circuit 35 of FIG. 1. The increase or decrease of the counting position continues until ultimately the desired black level in the signal R produced by the gamma amplifier 33 is equal to the reference voltage UB. The counter 105" is then in its optimal counting position.

To furnish an indication to the camera operator that the optimal black level adjustment has been achieved, the signals R−Y and B−Y are measured, since for the optimal adjustment the requirement must be satisfied that R−Y=B−Y=0. In the manner described for FIG. 4, the circuit 48 detects whether the signal at the terminal 115 is within the setting range of 20 mV. If this is the case the logic 1 occurs at the output of the gate 55 and, when the same condition is satisfied for the signal B−Y, the gate 55' of FIG. 1 also produces the logic 1, which together produce in the described manner, via the gate 59, the monitor picture shown in FIG. 2d. The operator now has the indication that the black level is adjusted optimally and he may release the push-button switch 16.

If, with the performed black level adjustment, the monitor picture shown in FIG. 2d does not appear after approximately 2.5 s, this is a further indication that the black level adjustment has not succeeded and cannot succeed. The operator must then takes further measures to find any errors in the black level control circuits.

A similar problem may be encountered in the white balance adjustment. If then, the monitor picture of FIG. 2a is still present after approximately 2.5 s, this is an indication that the scene to be televized is too purple (signals R and B too large) or too green (signals R and B too small) within the window area 25. In that case the operator must direct the camera to another portion of the scene where the light is of a more white color or may move special color filters into the path of the light 2.

What is claimed is:

1. A method for adjusting a television camera prior to scene recording using a monitor picture, said method comprising:

producing at least two spaced lines in said monitor picture during adjustments;

changing the composition of one of said lines indicating a camera adjustment to be performed in a first direction;

changing the composition of the other of said lines indicating a camera adjustment to be performed in a second direction; and changing the composition of both of said lines indicating proper camera adjustment.

2. A method as claimed in claim 1, wherein said method further comprises:

providing a plurality of ranges for adjusting said television camera;

selecting one of said plurality of ranges; and automatically adjusting said television camera within said selected range, whereby a change in the composition of one of said lines is indicative of an improper range being selected.

3. A method as claimed in claims 1 and 2, wherein said change in composition of said lines comprises causing the relevant line, or lines, to be broken.

4. A method as claimed in claim 3 wherein the white balance of a color television camera is adjusted and comprises measuring scene information located between said lines, producing color signals from said scene information, converting said color signals into a luminance signal and a first and a second color difference signal, and adjusting the amplification and attenuation in a white balance adjusting circuit so that said color difference signals are substantially zero in value whereby after said adjustment has been activated for a short period of time either one of said lines will be broken indicating a camera adjustment to be performed or both of said lines will be broken indicating proper camera adjustment.

5. A device for adjusting a television camera prior to scene recording using a monitor picture, said device comprising:

means for adjusting said camera;

means for generating at least two spaced lines in said monitor picture during adjustment;

first means for changing the composition of one of said lines indicating a camera adjustment to be performed in a first direction; and second means for changing the composition of the other of said lines indicating a camera adjustment to be performed in a second direction; whereby said first and second means are alternatively operative to indicate an out-of-adjustment condition and are simultaneously operative to indicate proper adjustment of said television camera.

6. A device as claimed in claim 5 wherein the adjusting means comprise a plurality of manually selectable ranges and means for automatically adjusting said television camera within the selected range whereby said first and second means, when operative in the alternative, indicate that automatic adjustment cannot be achieved in the selected range and further indicate in which direction, from said selected range in said plurality of manually selectable ranges, manual adjustment is required.

7. A device as claimed in claim 6 wherein said device further comprises means for detecting light from a scene to be recorded, said detecting means generating electrical signals dependent on the amount of said light and wherein said automatic adjusting means comprises a controllable amplifier having an input for receiving said signals, a control input and an output, and an adjusting circuit having an output coupled to said control input of said controllable amplifier, and an input coupled to the output of said controllable amplifier.

8. A device as claimed in claim 7 wherein said adjusting circuit comprises a setting circuit having an input and an output, and a detection circuit, wherein the input of said setting circuit is coupled to the input of said adjusting circuit and the output of said setting circuit is coupled both to said output of said adjusting circuit and to said detection circuit and wherein said detection circuit, which is coupled to said first and said second means for changing the composition of said lines, detects whether the setting range of said setting circuit and the control range of said controllable amplifier are exceeded.

9. A device as claimed in claim 8, wherein said adjusting circuit further comprises a second detection circuit, which is also coupled to said first and second line composition changing means, for detecting whether said input signal to said adjusting circuit is within a setting range of said setting circuit.

10. A device as claimed in claim 9, wherein said means for generating and said first and second means for changing the composition of said lines include logic gates interconnecting said first and said second detection circuits for forming three logic signal combinations as indications of an optimum adjustment, the exceeding of the setting range in one direction and the exceeding of the setting range in the other direction.

11. A device as claimed in any one of the claims 6–10, wherein said device is incorporated in a color television camera, wherein said plurality of manually selectable ranges comprise a filter disc having optical filters therein, one of said filters being a black filter, said filter disc further having a finger depending therefrom, said device further comprising an additional adjusting circuit, wherein said adjusting circuit is a black level adjusting circuit and said additional adjusting circuit is a white balance adjusting circuit, a momentary-contact switch, a change-over switch associated with said filter disc finger, in series with said momentary-contact switch for selectively coupling said momentary-contact switch to said black level and said white balance adjusting circuits, whereby when said black filter in said filter disc is selected, said finger engages said change-over switch coupling said black level adjusting circuit with said momentary-contact switch thereby insuring that only said black filter would be selected when performing black level adjustment.

12. A device as claimed in claim 11, wherein said white balance adjusting circuit includes a gate for stopping the setting circuit therein, said gate being operative when said white balance adjusting circuit is not activated.

* * * * *